(12) United States Patent
Shin et al.

(10) Patent No.: US 10,528,835 B2
(45) Date of Patent: Jan. 7, 2020

(54) IMAGE PROCESSING APPARATUS AND CONTROL METHOD THEREOF

(71) Applicant: SAMSUNG ELECTRONICS CO., LTD., Suwon-si (KR)

(72) Inventors: Yong-wook Shin, Osan-si (KR); Ki-jun Jeong, Seoul (KR); Chi-sang Jung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 423 days.

(21) Appl. No.: 14/573,681

(22) Filed: Dec. 17, 2014

(65) Prior Publication Data
US 2015/0178579 A1 Jun. 25, 2015

(30) Foreign Application Priority Data
Dec. 23, 2013 (KR) .................. 10-2013-0161166

(51) Int. Cl.
G06K 9/00 (2006.01)
H04N 21/4223 (2011.01)
(Continued)

(52) U.S. Cl.
CPC ..... *G06K 9/00892* (2013.01); *H04N 21/4223* (2013.01); *H04N 21/4415* (2013.01); *H04N 21/4661* (2013.01)

(58) Field of Classification Search
CPC ........... G06K 9/00221; G06K 9/00892; G06K 9/00885; G06F 21/32; G06F 21/46;
(Continued)

(56) References Cited

U.S. PATENT DOCUMENTS 8,301,455 B2   10/2012  Steinbiss
9,013,271 B2 *  4/2015  Aoki ................. G06F 21/32
                                              340/5.52
(Continued)

OTHER PUBLICATIONS

Communication dated Mar. 5, 2015, issued by the International Searching Authority in counterpart International Application No. PCT/KR2014/011724.
(Continued)

Primary Examiner — Thai Q Tran
Assistant Examiner — Syed Y Hasan
(74) Attorney, Agent, or Firm — Sughrue Mion, PLLC

(57) ABSTRACT

An image processing apparatus includes: a user input interface configured to provide a user input according to at least one input method; a storage configured to store a database for biometric information of at least one user which corresponds with at least one identification (IDs) previously registered to the image processing apparatus; a signal processor configured to process a preset service which is provided corresponding to an authenticated identification (ID) in response to a user being authenticated with the ID; and a controller configured to determine whether authentication is performed with regard to one of the IDs in response to an event occurring which identifies a current user, and retrieve and authenticate the ID from the database based on the biometric information of the current user acquired by the user input interface in response to determining that the authentication is not performed with regard to the ID.

22 Claims, 11 Drawing Sheets

(51) Int. Cl.
*H04N 21/4415* (2011.01)
*H04N 21/466* (2011.01)

(58) Field of Classification Search
CPC ..... H04L 61/10; H04L 9/3231; H04L 9/3226; G06T 7/0012; H04N 1/00854
USPC ........... 348/77; 382/116, 115, 128; 713/186; 725/46; 709/245; 340/5.82, 5.52, 5.53; 726/5; 358/1.14
See application file for complete search history.

(56) References Cited

U.S. PATENT DOCUMENTS

| | | | |
|---|---|---|---|
| 2004/0003392 A1 | 1/2004 | Trajkovic et al. | |
| 2004/0010724 A1* | 1/2004 | Brown | G06F 21/32 713/186 |
| 2008/0092170 A1* | 4/2008 | Shannon | H04N 5/44543 725/46 |
| 2008/0201579 A1* | 8/2008 | Whillock | G07C 9/00158 713/186 |
| 2009/0133051 A1 | 5/2009 | Hildreth | |
| 2010/0011424 A1* | 1/2010 | Ushiku | G06F 21/32 726/5 |
| 2010/0157088 A1 | 6/2010 | Irimoto | |
| 2010/0284575 A1* | 11/2010 | Yoshimine | G06K 9/00892 382/116 |
| 2012/0060176 A1 | 3/2012 | Chai et al. | |
| 2012/0124456 A1 | 5/2012 | Perez et al. | |
| 2012/0240165 A1 | 9/2012 | Pan | |
| 2012/0331566 A1 | 12/2012 | Lection et al. | |
| 2013/0114865 A1 | 5/2013 | Azar et al. | |
| 2013/0133042 A1 | 5/2013 | Mercredi et al. | |
| 2013/0147705 A1 | 6/2013 | Lee et al. | |
| 2013/0182279 A1* | 7/2013 | Yano | H04N 1/00854 358/1.14 |
| 2013/0208103 A1 | 8/2013 | Sands et al. | |
| 2013/0290565 A1* | 10/2013 | Kamakura | G06F 21/70 709/245 |
| 2014/0181947 A1* | 6/2014 | Lund | H04L 63/08 726/9 |

OTHER PUBLICATIONS

Communication dated Mar. 24, 2017, issued by the European Patent Office in counterpart European Application No. 14874302.4.

Jain A et al: "A Multimodal Biometric System Using Fingerprints, Face, and Speech", Audio- and Video-Based Biometric Person Authentication, XX, XX, Mar. 22, 1999 (Mar. 22, 1999), pp. 182-187, XP002211742, (6 pages total).

Communication dated Oct. 12, 2017, issued by the European Patent Office in counterpart European Application No. 14874302.4.

* cited by examiner

IMAGE PROCESSING APPARATUS AND CONTROL METHOD THEREOF

CROSS-REFERENCE TO RELATED APPLICATION

This application claims priority from Korean Patent Application No. 10-2013-0161166, filed on Dec. 23, 2013 in the Korean Intellectual Property Office, the disclosure of which is incorporated herein by reference.

BACKGROUND

Field

Apparatuses and methods consistent with the exemplary embodiments relate to an image processing apparatus processing an image signal to be displayed and a control method thereof. In particular, exemplary embodiments relate to an image processing apparatus and a control method thereof, in which a service customized corresponding to a user is provided by identifying the user.

Description of the Related Art

An image processing apparatus of the related art processes an image signal/image data received external from the image processing apparatus in accordance with a variety of image processing processes. The image processing apparatus of the related art displays the processed image signal as an image on its own display panel, or outputs the processed image signal to another display apparatus having a display panel so that the another display apparatus can display the received image signal. In other words, the image processing apparatus of the related art may have a display panel or no display panel, as long as the image processing apparatus can process the image signal. For example, the former includes a television (TV), and the latter includes a set-top box.

With recent developments in technology, various functions have been added and/or extended on the image processing apparatus. For example, a household TV or the like image processing apparatus in the related art allows one or more user accounts to be registered by a user, and then provides customized services corresponding to the user accounts in accordance with the login of the user account. The image processing apparatus of the related art requires a user to previously specify identification (ID) and a password for login to the user account. Thereafter, when a user inputs the information about the ID and password through character or numeral buttons provided in a remote controller, the image processing apparatus of the related art allows the user account corresponding to the input information to log on.

SUMMARY

An aspect of an exemplary embodiment may provide an image processing apparatus which includes: a user input interface configured to provide a user input according to at least one input method; a storage configured to store a database for biometric information of at least one user which corresponds with corresponds with at least one identification (IDs) previously registered in the image processing apparatus; a signal processor configured to process a preset service which is provided corresponding to an authenticated identification (ID) in response to a user being authenticated with the ID; and a controller configured to determine whether authentication is performed with regard to one of the IDs in response to an event occurring which identifies a current user, and retrieve and authenticate the ID from the database based on the biometric information of the current user acquired by the user input interface in response to determining that the authentication is not performed with regard to the ID.

The database may further include activity feature information of a current user with respect to use history of the image processing apparatus which corresponds with the biometric information, and the controller may acquire at least one of the biometric information and the activity feature information with respect to the current user at the identifying event, and may identify the current user by retrieving a record having a highest similarity with the acquired one of the biometric information and the activity feature information from the database.

The database may include a system ID assigned for distinguishing between respective records which include the biometric information and the activity feature information, and the controller may be further configured to identify the current user by assigning the system ID given to the record having the highest similarity to the current user.

The controller may be further configured to update the record having the highest similarity in the database with the acquired biometric information and activity feature information.

The database may include a record of a group including a plurality of users, and the controller may be further configured to derive at least one of the biometric information and the activity feature information with regard to each of a plurality of current users if the plurality of current users is sensed, and may retrieve the record of the group including a same number of users as a number of current users among the records of the database.

The record of the group may include the biometric information and the activity feature information according to the plurality of users who belong to the group, and the controller may be further configured to determine similarity by comparing at least one of the biometric information and the activity feature information individually derived with respect to each of the plurality of current users with the biometric information and the activity feature information of each user in the record of the group.

The controller may be further configured to determine a current time in response to the system ID of the current user being identified, and may select and provide a recommendation content based on the current time from a history that the current user which corresponds with the system ID has used the image processing apparatus.

The history of using the image processing apparatus may include a history of viewing an image program according to time and a day of week, and the controller may be further configured to select a recommendation program based on the current time among image programs which correspond with the viewing history and may control a guide image which notifies a selection result to be displayed.

The biometric information may include at least one of a voice feature vector of a user voice and a face feature vector of a user face.

In response to determining that the biometric information acquired through a first input method among the plurality of input methods of the user input interface is abnormal, the controller may be further configured to control a user interface (UI) image to be displayed for guiding an input based on a second input method so that the biometric information can be acquired through the second input method among the plurality of input methods of the user input interface.

An aspect of an exemplary embodiment may provide a method of controlling an image processing apparatus, the method includes: determining whether authentication is performed with regard to at least one identification (IDs) previously registered in the image processing apparatus in response to an event occurring which identifies a current user; acquiring biometric information of the current user through a user input using at least one method in response to determining that the authentication is not performed with regard to an identification (ID); retrieving and authenticating the ID based on the biometric information of the current user from a database of biometric information for at least one user which corresponds with the at least one previously registered IDs; and providing a preset service which corresponds with the authenticated ID to the current user.

The database may further include activity feature information for a history that the image processing apparatus has used by the current user which corresponds with the biometric information, the acquiring biometric information of the current user may include acquiring at least one of the biometric information and the activity feature information with respect to the current user, and the retrieving and authenticating the ID based on the biometric information of the current user may include identifying the current user by retrieving a record having the highest similarity with the acquired one of the biometric information and the activity feature information from the database.

The database may include a system ID assigned for distinguishing between respective records which include the biometric information and the activity feature information, and the identifying the current user may include identifying the current user by assigning the system ID given to the record having the highest similarity to the current user.

The retrieving and authenticating the ID based on the biometric information of the current user may include updating the record having the highest similarity in the database with the acquired biometric information and the activity feature information.

The database may include a record of a group including a plurality of users, and the identifying the current user includes: deriving at least one of the biometric information and the activity feature information with regard to each of a plurality of current users if the plurality of current users is sensed; and retrieving the record of the group including a same number of the users as a number of current users among the records of the database.

The record of the group may include the biometric information and the activity feature information according to the plurality of users who belong to the group, and the identifying the current user may include determining the similarity by comparing at least one of the biometric information and the activity feature information individually derived with respect to each of the plurality of current users with the biometric information and the activity feature information of each user in the record of the group.

The identifying the current user may include determining a current time in response to the system ID of the current user being identified, and the providing the preset service corresponding to the authenticated ID includes selecting and providing a recommendation content based on the current time from a history that the current user which corresponds with the system ID has used the image processing apparatus.

The history of using the image processing apparatus may include a history of viewing an image program according to a time and a day of week, and the selecting and providing a recommendation content includes selecting a recommendation program based on the current time among image programs which correspond with the viewing history and displaying a guide image which notifies a selection result.

The biometric information may include at least one of a voice feature vector of a user voice and a face feature vector of a user face.

The acquiring biometric information of the current user may include, in response to determining that the biometric information acquired through a first input method among the plurality of input methods of the user input interface is abnormal, displaying a user interface (UI) image for guiding an input based on a second input method so that the biometric information can be acquired through the second input method among the plurality of input methods of the user input interface.

An image processing apparatus includes: a user input interface configured to provide a user input through at least one input method; a signal processor configured to process a content data signal and a broadcasting signal input, which are externally input to the image processing apparatus, to be displayed as an image; a storage configured to store at least one user identification (IDs) and a database of at least one biometric information which corresponds to the user IDs; and a controller configured to authenticate a previously stored user ID by comparing biometric information of a user acquired through the user input interface with biometric information acquired based on the database, and control the signal processor to provide a preset service corresponding to the authenticated user ID.

The controller may be further configured to generate a new user ID corresponding to the acquired biometric information in response to determining that the user ID which corresponds to the acquired biometric information is not present in the database, and may update the database with the new user ID.

An aspect of an exemplary embodiment may provide a method of providing a recommendation service, the method includes: acquiring a system identification (SID) of a current user; checking a current time in response to acquiring the SID of the current user; acquiring content information which corresponds with the SID of the current user and the current time from an activity history database in response to the current time being checked; retrieve at least one recommendation content from the acquired content information in response to the content information being acquired; and providing a retrieved result to the current user.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings. In the following exemplary embodiments, only elements directly related to the exemplary embodiment will be described, and descriptions about the other elements will be omitted. However, it will be appreciated that the elements, the descriptions of which are omitted, are not unnecessary to realize the apparatus or system according to the exemplary embodiments.

Figure 1:
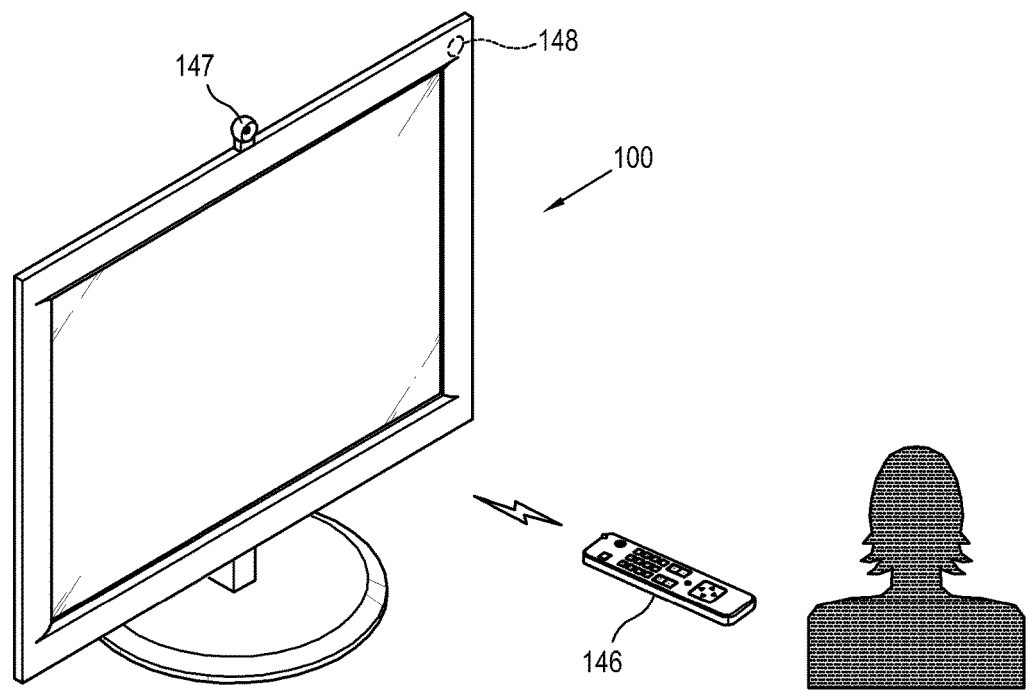
FIG. 1 shows an example of an image processing apparatus or display apparatus according to a first exemplary embodiment.

FIG. 1 shows an example of an image processing apparatus 100 according to a first exemplary embodiment. In this exemplary embodiment, the image processing apparatus 100 is a display apparatus which can display an image. However, an exemplary embodiment may be applied to an image processing apparatus 100 which cannot display an image. In this case, the image processing apparatus 100 may locally connect with a separate external display apparatus so that the image can be displayed on the external display apparatus.

As shown in FIG. 1, the image processing apparatus 100 in this exemplary embodiment processes image data of contents received external to the display apparatus or stored therein, and displays the contents as an image corresponding to the contents. The image processing apparatus 100 according to this exemplary embodiment is achieved by a television (TV), but not limited thereto. Alternatively, the exemplary embodiment of the image processing apparatus 100 may be achieved by various display apparatuses as long as it can process the image data and display it as an image.

In general, a user sits in front of the image processing apparatus 100 and views an image displayed on the image processing apparatus 100. The image processing apparatus 100 provides various interface environments, e.g., a multiple input structure or a multiple recognition structure, so that a user can control operations of the image processing apparatus 100.

As an example of the multiple input structure, the image processing apparatus 100 includes a remote controller 146 which is separated from the image processing apparatus 100 and may provide various kinds of function buttons, a touch pad, a display, etc.; a camera 147 for photographing ambient environments and a user of the image processing apparatus 100; and a microphone 148 for receiving a user speech/utterance. Of course, such an input interface environment of the image processing apparatus 100 is not limited to the foregoing examples. Alternatively, another input structure (not described above) may be additionally provided in the image processing apparatus 100.

The image processing apparatus 100 performs a preset function or operation, based on information input by a user through various multiple input structures.

Below, detailed configurations of the image processing apparatus 100 will be described with reference to FIG. 2.

Figure 2:
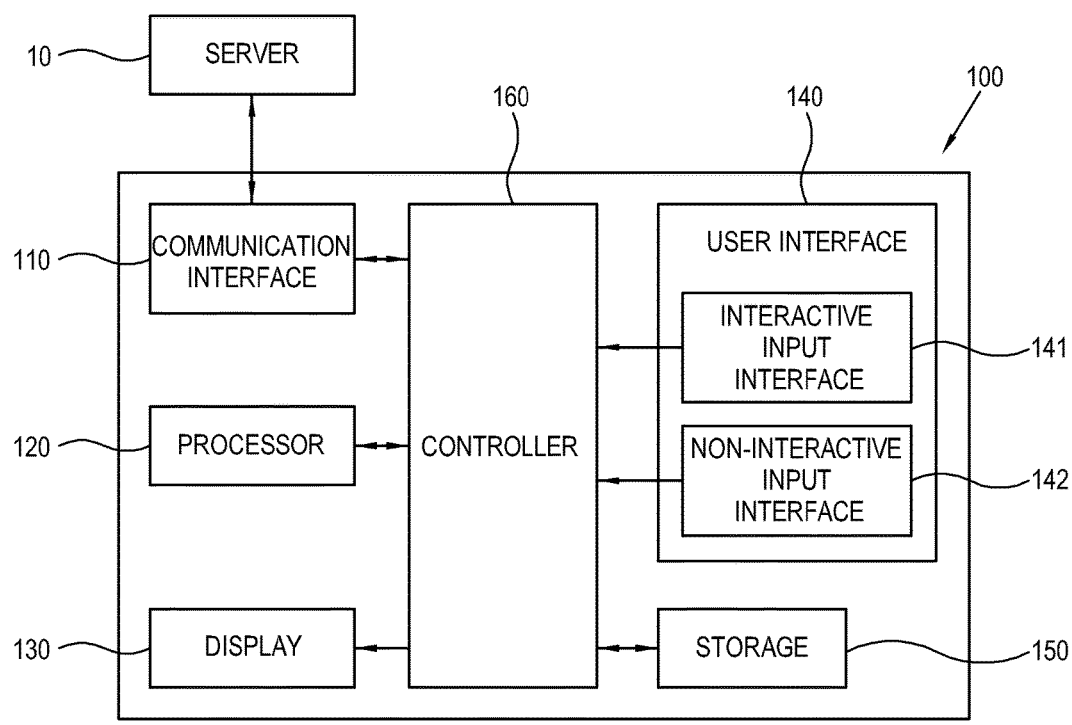
FIG. 2 is a block diagram of the display apparatus of FIG. 1.

FIG. 2 is a block diagram of the image processing apparatus 100.

Referring to FIG. 2, the image processing apparatus 100 includes a communication interface 110 which communicates with the exterior to transmit and receive data/a signal; a processor 120 which processes the data received in the communication interface 110 in accordance with a preset process; a display 130 which displays image data as an image if the data processed by the processor 120 is the image data; a user interface 140 through which a user input operation is performed; a storage 150 which stores data/information; and a controller 160 which controls general operations the image processing apparatus 100.

The communication interface 110 transmits/receives data so that interactive communication can be performed between the image processing apparatus 100 and a server 10 or the like external device. The communication interface 110 accesses the external device (not shown) through wired/wireless wide/local area networks or locally in accordance with preset communication protocols.

The communication interface 110 may be achieved by connection ports according to devices or an assembly of connection modules, in which the protocol for connection or a target for connection is not limited to one kind or type of external device. The communication interface 110 may be internally provided in the image processing apparatus 100, but not limited thereto. Alternatively, the entire or a part of the communication interface 110 may be added to the image processing apparatus 100 in the form of an add-on or dongle type.

The communication interface 110 transmits/receives a signal in accordance with protocols designated according to the connected devices, in which the signals can be transmitted/received based on individual connection protocols with regard to the connected devices. In the case of image data, the communication interface 110 may transmit/receive the signal bases on various standards such as a radio frequency (RF) signal, composite/component video, super video, Syndicat des Constructeurs des Appareils Radioré-cepteurs et Téléviseurs (SCART), high definition multimedia interface (HDMI), display port, unified display interface (UDI), or wireless HD, etc.

The processor 120 performs various processes with regard to data/a signal received in the communication interface 110. If the communication interface 110 receives the image data, the processor 120 applies an imaging process to the image data and the image data processed by this process is output the display 130, thereby allowing the display 130 to display an image based on the corresponding image data. If the signal received in the communication interface 110 is a broadcasting signal, the processor 120 extracts video, audio and appended data from the broadcasting signal tuned to a certain channel, and adjusts an image to have a preset resolution, so that the image can be displayed on the display 130.

There is no limit to the kind of imaging processes to be performed by the processor 120. For example, there may be decoding corresponding to an image format of the image data, de-interlacing for converting the image data from an interlace type into a progressive type, scaling for adjusting the image data to have a preset resolution, noise reduction for improving image qualities, detail enhancement, frame refresh rate conversion, etc.

The processor 120 may perform various processes in accordance with the kinds and attributes of data. Thus, the process to be implemented in the processor 120 is not limited to the imaging process. Also, the data which is processed in the processor 120 is not limited to only that received in the communication interface 110. For example, the processor 120 processes information about a user speech or motion in accordance with preset sound or motion processing operations when the corresponding speech or motion is sensed through the user interface 140.

The processor 120 may be achieved by an image processing board (not shown) comprising a system-on-chip in which various functions are integrated or an individual chip-set capable of independently performing each process is mounted on a printed circuit board. The processor 120 may be built-in the image processing apparatus 100.

The display 130 displays the video signal/the image data processed by the processor 120 as an image. The display 130 may be achieved by various display types such as liquid crystal, plasma, a light-emitting diode, an organic light-diode, a surface-conduction electron-emitter, a carbon nano-tube and a nano-crystal, but not limited thereto.

The display 130 may additionally include an appended element in accordance with its types. For example, in the case of the liquid crystal type, the display 130 may include a liquid crystal display (LCD) panel (not shown), a backlight unit (not shown) which emits light to the LCD panel, a panel driving substrate (not shown) which drives the panel (not shown), etc.

The user interface 140 transmits a variety of preset control command or information to the controller 160 in accordance with a user control or input. The user interface 140 converts various events occurred by a user in accordance with a user intention to a preset control command or information and transmits the preset control command or information to the controller 160. The events generated by a user may be given in many forms, for example, a user control, speech, motion, gesture, etc.

The user interface 140 is provided to sense information through a method by which a user inputs the information. In accordance with the input methods, the user interface 140 is sorted into an interactive input interface 141 and a non-interactive input interface 142.

The interactive input interface or a voice input interface 141 is provided to receive a user speech. For example, the interactive input interface 141 is achieved by a microphone 148 (see FIG. 1), and senses various sounds generated in the ambient environment of the image processing apparatus 100. The interactive input interface 141 generally senses a user speech, but not limited thereto, and further senses sounds generated due to various environmental facts external to the user.

The non-interactive input interface or a non-voice input interface 142 is provided to receive a user input except the user input based on the speech. In this case, the non-interactive input interface 142 may be achieved variously, for example, by a remote controller 146 (see FIG. 1), a camera 147 (see FIG. 1), a menu key or input panel provided outside the image processing apparatus 100, a motion sensor for sensing a user gesture, etc.

The non-interactive input interface 142 may be achieved by a touch screen installed in the display 130. In this case, a user may touch an input menu or a user interface (UI) image displayed on the display 130, so that a preset command or information can be transmitted to the controller 160.

According to an exemplary embodiment, the interactive input interface 141 is provided in a main body of the image processing apparatus 100, but not limited thereto. Alternatively, the interactive input interface 141 may be additionally provided in the remote controller 145 or may be achieved as an external device separated from the image processing apparatus 100.

The storage 150 stores various pieces of data under control of the controller 160. The storage 150 is achieved by a nonvolatile memory such as a flash memory, a hard disk drive, etc., so as to retain data regardless of power on/off of the system. The storage 150 is accessed by the controller 160 so that the previously stored data can be read, recorded, modified, deleted, updated, and so on.

The controller 160 is achieved by a central processing unit (CPU), and controls operations of the elements of the image processing apparatus 100, such as the processor 120, in response to occurrence of a preset event. For example, if the communication interface 110 receives the image data of predetermined contents, the controller 160 controls the processor 120 to process the image data to be displayed as an image on the display 130. Also, if a user input event occurs through the user interface 140, the controller 160 controls the processor 120 and the like elements to perform preset operations corresponding to the corresponding event.

With this configuration, the image processing apparatus 100 can provide various services and functions to a user. However, if the image processing apparatus 100 is achieved by a TV (as opposed to a mobile device used by a single user), the image processing apparatus 100 may be used by a plurality of users. Of course, even when the image processing apparatus 100 is achieved by the mobile device, it may be shared by a plurality of users in accordance with using forms.

In the case where the image processing apparatus 100 is used by a plurality of users, the image processing apparatus 100 needs to first authenticate the users in order to provide custom services customized according to the users. Thus, the image processing apparatus 100 identifies a user by authenticating the user through the following methods.

Figure 3:
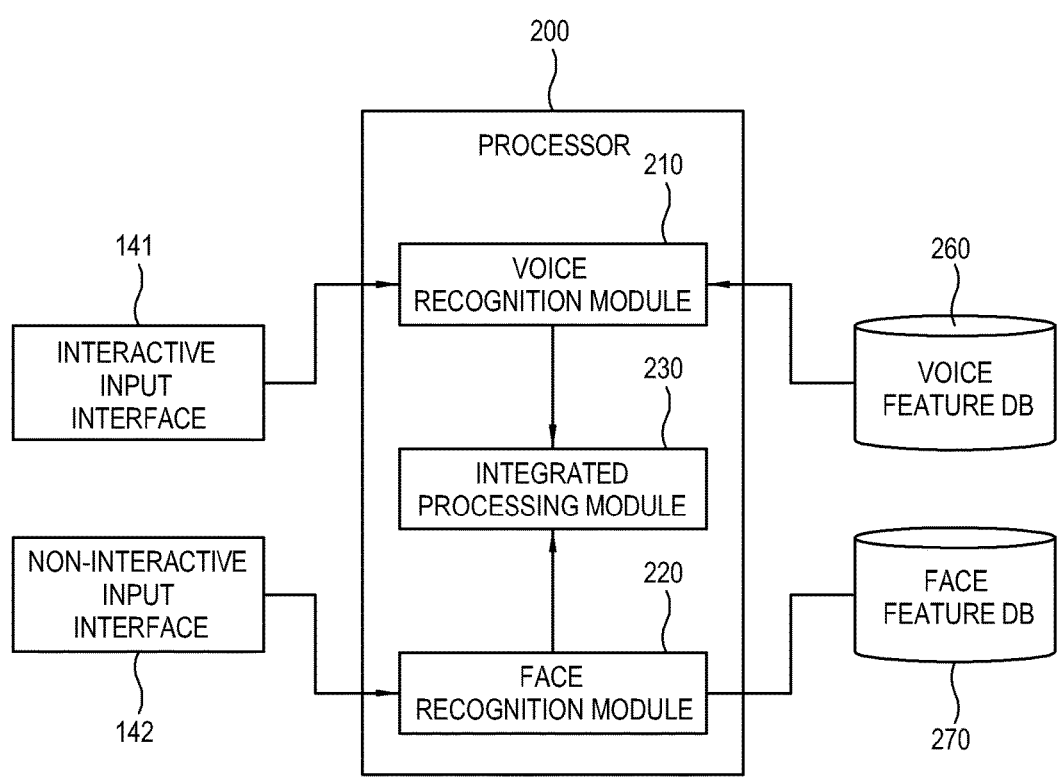
FIG. 3 is a block diagram showing a structure of a processor for authenticating a user based on input user-related information, in the display apparatus of FIG. 1.

FIG. 3 is a block diagram showing a structure of a processor 200 for authenticating a user based on input user-related information.

As shown in FIG. 3, the processor 200 includes a voice recognition module 210 which derives voice feature information by processing a user speech/utterance information received from the interactive input interface 141; a face recognition module 220 which derives face feature information by processing a user face information received from the non-interactive input interface 142; and an integrated processing module 230 which performs user authentication based on the voice feature information and face feature information derived as above.

The processor 200 in this exemplary embodiment may be replaced by the processor 120 of FIG. 2. Thus, the processor 200 replaced by the processor 120 may be applied to the image processing apparatus 100 of FIG. 2.

In this exemplary embodiment, data related to a user is collected for the user authentication through at least two input structures from the interactive input interface 141 and the non-interactive input interface 142, and the collected data is transmitted to the processor 200. For example, the interactive input interface 141 transmits a user voice data to the processor 200, and the non-interactive input interface 142 transmits a user face image data to the processor 200.

The voice recognition module 210 processes a user voice data based on a preset voice processing algorithm, thereby deriving the voice feature vector of the voice data. The voice recognition module 210 can access a voice feature DB 260, i.e., a database where a previously registered user ID and a voice feature vector are matched with each other. Thus, the voice recognition module 210 performs retrieval in the voice feature DB 260 based on the derived voice feature vector. In other words, the voice recognition module 210 retrieves the user ID having high similarity from the voice feature DB 260.

The face recognition module 220 processes a user face image data through the preset face processing algorithm, thereby deriving the face feature vector of the face image data. The face recognition module 220 can access a face feature DB 270 where the previously registered user ID and the face feature vector are matched with each other. The face recognition module 220 performs retrieval in the face feature DB 270 based on the derived face feature vector. In other words, the face recognition module 220 retrieves user ID having a high similarity from the face feature DB 270.

Each of the voice processing algorithm and the face processing algorithm may employ various methods to derive the feature vector with regard to the input data. The face recognition module 220 may use histograms of oriented gradients (HOG) or an edge detecting algorithm as an example of the face processing algorithm to derive a feature vector of a face image.

The integrated processing module 230 combines results from the voice recognition module 210 and the face recognition module 220. Thus, the integrated processing module 230 specifies a user ID matched with the input user-related data. For example, if the results of searching the user IDs respectively received from the voice recognition module 210 and the face recognition module 220 are identical to each other, the integrated processing module 230 selects the corresponding user ID. Also, the integrated processing module 230 collects a plurality of results equal to or higher than a predetermined score from each of the voice recognition module 210 and the face recognition module 220, and selects the user ID that both the voice recognition module 210 and the face recognition module 220 have in common. Further, if the voice recognition module 210 and the face recognition module 220 do not have search results in common, the integrated processing module 230 determines this as a new user.

When biometrics such as a user voice data and face data is input, the processor 200 compares and determines whether it is matched with the user ID information previously stored by a user, and specifies the user ID in accordance with the matched results.

According to an exemplary embodiment, if a user is authenticated with a previously registered ID, the image processing apparatus 100 may provide a service previously set up corresponding to the authenticated ID. The image processing apparatus 100 stores a database of the biometric information corresponding to the previously registered ID. The image processing apparatus 100 determines whether an authentication with regard to the previously registered ID is performed when an event occurs to identify the current user. If a user does not perform an authentication process for an ID by directly inputting the ID and the password, that is, if the ID is not authenticated, the image processing apparatus 100 searches and authenticates the ID from the database based on the current user biometric information acquired through the user input interface 140.

However, the first exemplary embodiment does not take the followings matters into account.

The first exemplary embodiment is focused on the processor 200 authenticating a user by comparing the user features with features of a user previously registered when the features of the user are acquired. Thus, the first exemplary embodiment does not consider the required user ID in an application being currently executed by the processor 200.

The first exemplary embodiment is applied to only a case that a user is one individual. However, a display apparatus such as a TV may be used by a plurality of users grouped like a family. Thus, the first exemplary embodiment does not consider a group unit involving a plurality of users.

Thus, the first exemplary embodiment considers the biometrics of a user, but does not consider a user use history data, i.e., a user activity data when authenticating the user.

If a user style of using the image processing apparatus 100 is taken into account, some users previously register the user account or the user ID and then log in to the previously registered user account at a later time. However, some users do not previously register the user account and do not log in to the user account at a later time. Also, even though a user previously registers the user account to the display apparatus, the user may not log in to the user account at a later time.

The image processing apparatus 100 cannot specify a user who uses the image processing apparatus 100 but does not log in with the user ID, has a limit to providing a custom service customized according to users. If there is no registered user ID, the image processing apparatus 100 provides a service based on default settings, but cannot guarantee the quality of custom service when it is used by a plurality of users.

Therefore, a method of identifying a user who does not perform the user authentication process of the first exemplary embodiment and providing a custom service customized for the user may be needed. Further, a method of providing a group service for a group involving a plurality of users, as well as an individual service for individuals, may be needed.

A second exemplary embodiment taking the foregoing matters into account will be described.

According to an exemplary embodiment, the database of the image processing apparatus 100 further includes a record of activity feature information about a history that the image processing apparatus 100 has been used by a user which corresponds to biometric information of the user. If an event occurs to identify the current user, the image processing apparatus 100 acquires at least one of the biometric information and the activity feature information with respect to the current user, and retrieves a record having the highest similarity with the acquired information from the database. Therefore, the current user is identified.

Figure 4:
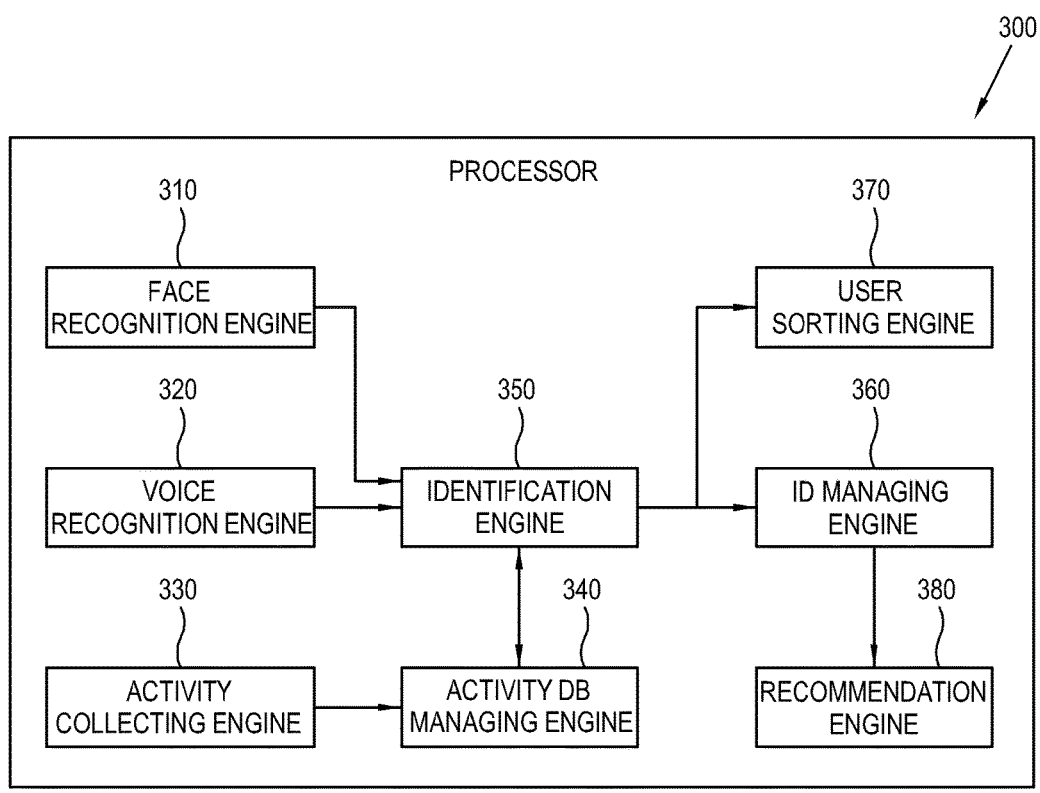
FIG. 4 is a block diagram of a processor according to a second exemplary embodiment.

FIG. 4 is a block diagram of a processor 300 according to the second exemplary embodiment.

As shown in FIG. 4, the processor 300 includes a plurality of blocks, modules or engines 310, 320, 330, 340, 350, 360, 370 and 380 for specifying a user who does not log in to the ID previously registered by the user, i.e., a user who does not register the user ID. The processor 300 in this exemplary embodiment may be replaced by the processor 120 of FIG. 2. Thus, the processor 300 replaced by the processor 120 may be applied to the image processing apparatus 100 of FIG. 2.

These engines 310, 320, 330, 340, 350, 360, 370 and 380 are sorted in accordance with functions performed. In this exemplary embodiment, the processor 300 is not achieved by one limited method. These engines 310, 320, 330, 340, 350, 360, 370 and 380 may be achieved by hardware or software. The engines 310, 320, 330, 340, 350, 360, 370 and 380 that constitute the processor 300 may respectively perform individual operations, or one operation may be performed by the processor 300 without being divided by the engines 310, 320, 330, 340, 350, 360, 370 and 380. Also, the operations of the processor 300 and the respective engines 310, 320, 330, 340, 350, 360, 370 and 380 are performed by the controller 160 (see FIG. 2).

The processor 300 includes a face recognition engine 310, a voice recognition engine 320, an activity collecting engine 330, an activity DB managing engine 340, an identification engine 350, an ID managing engine 360, a user sorting engine 370, and a recommendation engine 380. The names of the respective engines 310, 320, 330, 340, 350, 360, 370 and 380 are given for convenience, and the names and terms do not limit the scope of the exemplary embodiments. Also, the processor 300 may include another element in addition to these engines 310, 320, 330, 340, 350, 360, 370 and 380.

The face recognition engine 310 converts a user face image data into a face feature vector. The voice recognition engine 320 converts a user voice data into a voice feature vector. The user-related data to be processed by the face recognition engine 310 and the voice recognition engine 320 are sensed and collected through the user interface 140 (see FIG. 2).

The activity collecting engine 330 collects activity information that a certain user has used the image processing apparatus 100. A user activity may include various styles of using the image processing apparatus 100. For example, view information about a broadcasting channel, a genre, casting or the like of an image program that a user has viewed may be targeted for collection. However, this example is selected to explicitly describe the exemplary embodiment, and the activity targeted for collection may include various styles.

To associate the user with the activity, the activity collecting engine 330 has to specify a user who is currently using the image processing apparatus 100. The specifying of the current user is transmitted from the ID managing engine 360 to the activity collecting engine 330. The specifying of the current user will be described below with the description of the ID managing engine 360.

The activity DB managing engine 340 stores the user and activity information collected by the activity collecting engine 330 in a activity history DB, and transmits a previously stored activity history to other elements in response to requests. The activity history DB will be described later. The activity DB managing engine 340 may transmit the current activity information of a user who is not identified, which is collected by the activity collecting engine 330 at an event for identifying a user to the identification engine 350.

The identification engine 350 acquires the face feature vector from the face recognition engine 310 and the voice feature vector from the voice recognition engine 320, and derives an activity feature vector from the activity history or the activity information received from the activity DB managing engine 340. Further, the identification engine 350 derives one final feature vector from three feature values, i.e., the face feature vector, the voice feature vector and the activity feature vector acquired by one user.

There may be various methods of deriving the final feature vector. For example, the final feature vector may be derived by connecting values of the face feature vector, the voice feature vector and the activity feature vector in a row. Also, in this exemplary embodiment, three values of the face feature vector, the voice feature vector and the activity feature vector are all considered, but not limited thereto. Alternatively, only a part among three feature values may be considered.

The identification engine 350 may access a previously stored user profile. The user profile refers to history information where a feature vector value of a user previously identified or specified is stored, in which an ID not registered by the user but given by the image processing apparatus 100 itself and the feature vector matching with the corresponding ID are stored. For convenience, the ID registered by a user will be called a user ID or UID, and the ID not registered by a user but given by the image processing apparatus 100 itself to distinguish an unregistered user from the registered user will be called a system ID or SID.

The user profile stores the SID, and the feature vector corresponding to the SID. The SID may be specified as a unit of not only an individual user but also a group including a plurality of users.

The identification engine 350 retrieves a user profile based on the final feature vector derived with respect to the current user if a requesting event occurs to identify the current user. The identification engine 350 assigns the SID, of which the feature vectors within the user profile have the highest similarity with the final feature vector of the current user, to the current user, thereby specifying the current user to the corresponding SID.

The ID managing engine 360 serves to manage UID. If a user logs in to a certain UID, the ID managing engine 360 specifies the corresponding user to the corresponding UID. If an application requests an ID, the ID managing engine 360 notifies the application of the UID or the SID in accordance with the certain types of the user.

In other words, there are two different ways of specifying a user of the image processing apparatus 100. One way is to specify a user who logs in to the user ID, i.e., the UID previously registered to the image processing apparatus 100. The other way is to specify a user by giving the SID to the user who does not log in to the previously registered user ID.

In storing the SID and the corresponding feature vector in the user profile, if the SID is a ID corresponding to one group including a plurality of users, the user sorting engine 370 processes the users of the group to be distinguished within the user profile. In other words, the user sorting engine 370 processes the records of the feature vectors to be sorted according to the users within the SID for one group.

If the SID of the current user is specified, the recommendation engine 380 retrieves the activity history corresponding to the SID from the activity history DB, and provides a recommendation service.

The activity history DB to be managed by the activity DB managing engine 340 will be described.

Figure 5:
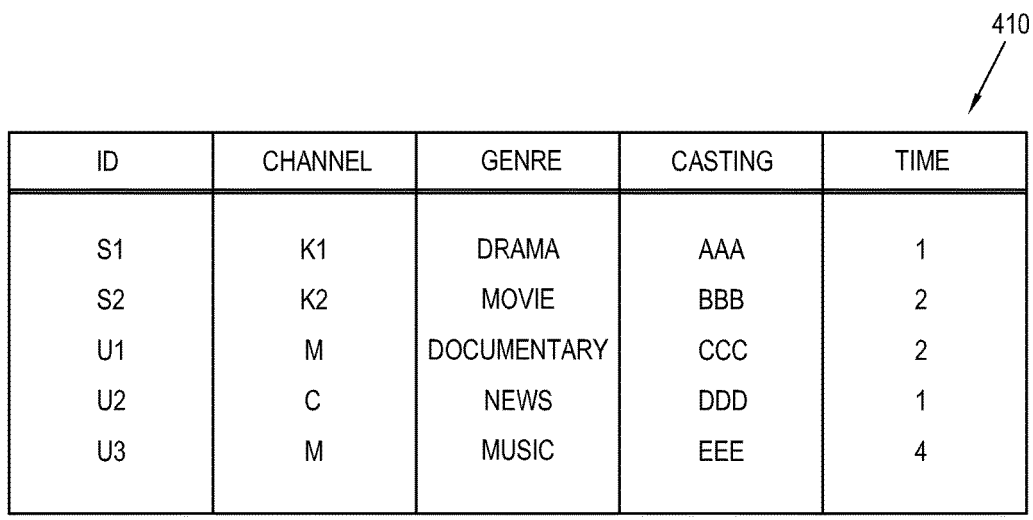
FIG. 5 shows an example of viewing histories matched with identifications (IDs) in a use history database (DB), used in a processor of FIG. 4.

FIG. 5 shows an example of viewing histories matched with identifications (IDs) in the use history database 410.

The example shown in FIG. 5 is one of various types of the activity history DB 410, and does not limit the embodiment of the activity history DB 410. Also, the present exemplary embodiment shows only one record matched with each ID for convenience, but the number of records is not limited thereto. Alternatively, two or more records may be matched with one ID. Also, the present exemplary embodiment shows four columns of a channel, a genre, casting, and time with respect to the viewing history 22. However, the number and kind of columns are not limited to this example. Therefore, a content of the record in each column is not limited to this example.

As shown in FIG. 5, the activity history DB 410 includes the IDs of the users, and information about a channel, a genre, casting, time, etc., of an image program viewed by the user matched with each ID according to time.

Time represented by an integer is a time index. The time index is obtained by digitizing a time section of a preset period unit, as one of preset methods for representing time. For example, a week may be digitized in such a manner that 12 am Monday is designated as an index of "1", and one o'clock Monday is designated as an index of "2".

The ID of the activity history DB 410 stores both the SID and the UID. For example, S1 and S2 are the SID, and U1, U2, and U3 are the UID. The contents of the activity history DB 410 shows an activity history that a user corresponding to the SID of S1 viewed a drama of a channel "K1," where "AAA" is casted at a time corresponding to the index of "1". Such an activity history record for the SID may be converted into an activity feature vector in accordance with a preset algorithm.

In the activity history DB 410, the activity history data related to the SID is converted into the activity feature vector, and used for forming the user profile to be referred to by the identification engine 350.

The user profile to be referred to by the identification engine 350 will be described.

Figure 6:
FIG. 6 shows an example of a record of a user profile with regard to a certain system ID (SID), used in the processor of FIG. 4.

FIG. 6 shows an example of a record of a user profile 420 with regard to a certain SID.

For a simple and clear description, FIG. 6 shows only the record related to one SID. In practice, the user profile 420 may include the record related to a plurality of SIDs.

As shown in FIG. 6, the user profile 420 includes a feature vector with regard to the SID of "S1". Here, "S1" is the SID corresponding to a group including three users. In this exemplary embodiment, an ID is given to a group including a plurality of users by regarding the group as one virtual user.

In the group, a voice feature vector V1 of a first user, a voice feature vector V2 of a second user, and a voice feature vector V3 of a third user are different in value from one another since the users are different individuals. For the same reason, a face feature vector F1 of the first user, a face feature vector F2 of the second user, and a face feature vector F3 of the third user are different in value from one another.

However, since the first user, the second user and the third user belong to one group, it may be estimated that they view the same image program at the same time. In this case, the feature vectors C1, C2 and C3 of the channel are the same, the feature vectors G1, G3 and G3 of the genre are the same, and the feature vectors S1, S2 and S3 are the same. Thus, the first user, the second user, and the third user have the same activity feature vector.

In other words, in the group having the SID of "S1", the voice feature vector and the face feature vector refer to characteristic values according to users, and the users have the same activity feature vector.

The final feature vector T1 of the first user is derived based on all the feature vectors V1, F1, C1, G1 and S1. To drive the final feature vector T1, various algorithms may be used. For example, T1 may be generated by connecting the feature vectors of V1, F1, C1, G1, S1 in a row.

With regard to the user profile 420 stored, the identification engine 350 compares a final feature vector of a user targeted for identification with the values registered in the user profile 420 when a request is generated for identifying the current users. In results from a comparison, the identification engine 350 specifies the SID of the user profile 420 having the highest similarity as the SID of the user who is targeted for the identification.

Below, a process of transmitting data among the elements of the processor 300 will be described with reference to FIG. 7.

Figure 7:
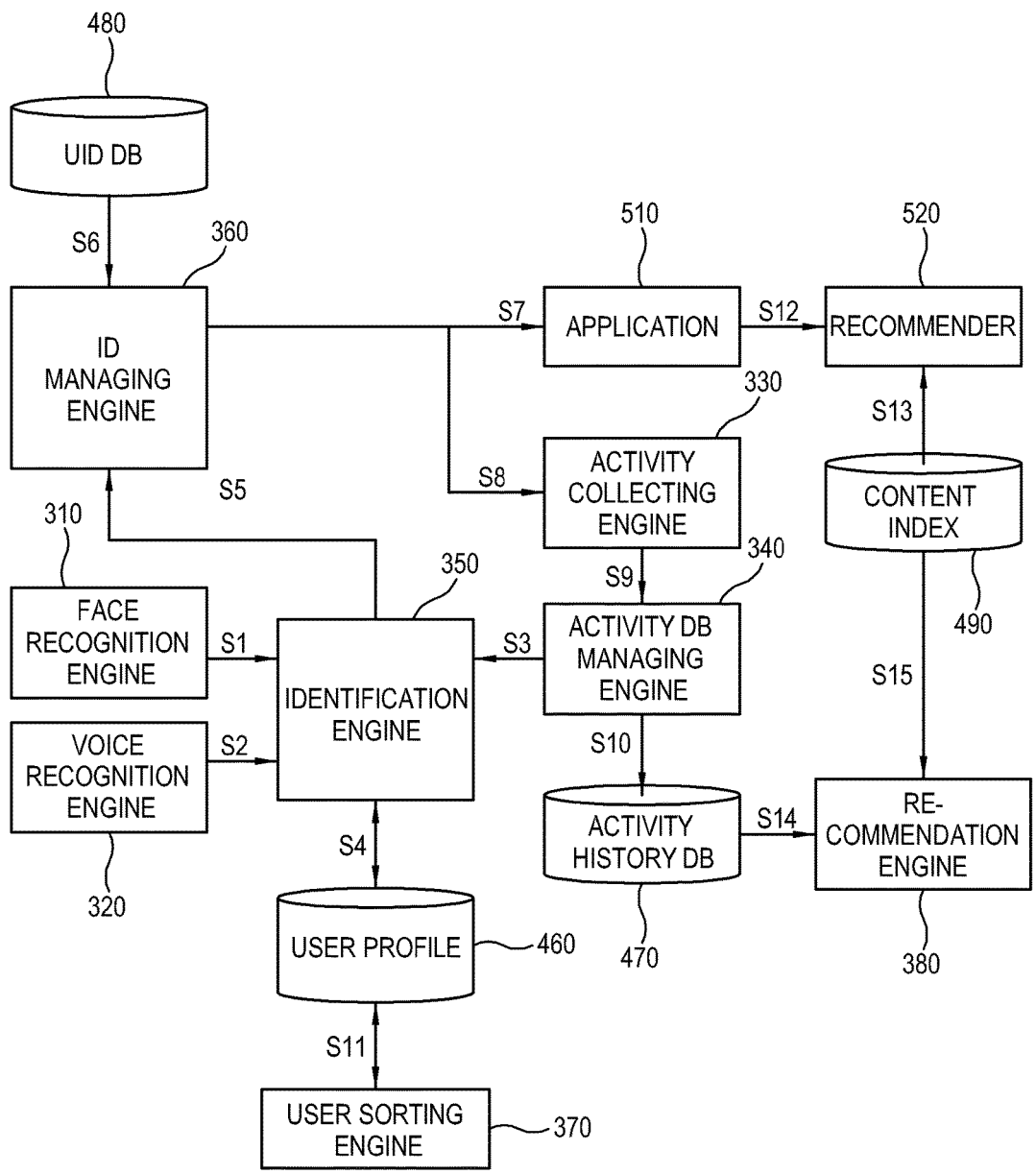
FIG. 7 shows an example of transmitting data, performed in a processor according to a third exemplary embodiment.

FIG. 7 shows an example of transmitting data, performed in the processor 300. The structure shown in this exemplary embodiment follows the configuration of FIG. 4.

As shown in FIG. 7, the processor 300 includes the face recognition engine 310, the voice recognition engine 320, the activity collecting engine 330, the activity DB managing engine 340, the identification engine 350, the ID managing engine 360, the user sorting engine 370, and the recommendation engine 380, and the descriptions of these elements are the same as above.

The identification engine 350 is provided to access a user profile 460 in which a SID of a user who is previously identified or specified and a history of the user feature vector are stored. The activity DB managing engine 340 is provided to access a activity history DB 470. The ID managing engine 360 is provided to access a UID DB 480 in which a UID registered by the user is stored.

Operations of the elements and a process of transmitting data will be described when an event occurs to identify the current user. The above event may be caused by a user, or may be periodically and automatically performed by the image processing apparatus 100.

The face recognition engine 310 generates a face feature vector through face recognition of the current user, and transmits this face feature vector to the identification engine 350 (S1). The voice recognition engine 320 generates a voice feature vector through voice recognition of the current user, and transmits this voice feature vector to the identification engine 350 (S2). The activity DB managing engine 340 generates the activity feature vector based on the activity of the current user, and transmits it to the identification engine 350 (S3).

The identification engine 350 derives a final feature vector from the face feature vector, the voice feature vector, and the activity feature vector. The identification engine 350 compares the derived final feature vector with the feature vectors of the user profile 460, and selects the SID having the highest similarity among the SIDs having similarity higher than a predetermined value, thereby updating the record of the selected SID of the user profile 460 with the final feature vector (S4). If the SID similar to the final feature vector is not present in the user profile 460, the identification engine 350 generates a new SID corresponding to the derived final feature vector and updates the user profile 460.

The identification engine 350 transmits the selected SID as the ID of the current user to the ID managing engine 360 (S5).

If a plurality of current users is sensed, the identification engine 350 derives the final feature vectors according to the users, respectively. For example, if there are three current users, the identification engine 350 invokes SIDs corresponding to three users among the SIDs of the user profile 460 and their feature vectors, and calculates a similarity between three feature vectors of each invoked SID and the final feature vectors of three current users.

Such a method for calculating the similarity may employ various algorithms. For example, a similarity between the groups may be calculated in accordance with clustering methods. The method of calculating a similarity is described below.

The final feature vectors of the current users are expressed as points on a preset 2D plane, and the feature vectors of the SID of the user profile 460 are also expressed as points on the same plane. In this case, if coordinates at a point of the final feature vector of the current user are close to those at a point of the feature vector of the SID of the user profile 460 within a predetermine range, it is determined that the quality of clustering results is equal to or higher than a preset threshold. Similarly, if the clustering result has a high quality, it is determined that two feature vectors targeted for comparison are caused by one user.

The identification engine 350 applies this processor to all the invoked SIDs, and assigns the SID having the highest clustering quality to an ID for a group corresponding to a plurality of users.

The ID managing engine 360 acquires a UID corresponding to a login from the UID DB 480 if a user logs in to the previously registered ID (S6). If there is no currently activated UID, the ID managing engine 360 requests the identification engine 350 for an ID and thus acquires the specified SID from the identification engine 350 (S5).

The ID managing engine 360 provides the SID or UID acquired as above to an application if the application that requires the ID (S7). Also, the ID managing engine 360 provides the acquired SID or UID to the activity collecting engine 330 (S8), so that the activity collecting engine 330 can collect the activity information of a user with respect to the provided SID or UID.

The activity collecting engine 330 transmits the collected activity history of the user to the activity DB managing engine 340 (S9), so that the activity DB managing engine 340 updates the activity history DB 470 with the received activity history. The identification engine 350 acquires the activity history information of the SID updated in the activity history DB 470, thereby updating the record of the corresponding SID of the user profile 460. The user sorting engine 370 generates the feature vectors according to users from the feature vector of the SID, i.e., the ID for the group, thereby updating the feature vectors according to the users of the group (S11).

An application 510 provides various custom services based on the acquired SID or UID. For example, the SID is provided to a recommender 520 subordinate to the application 510, so that the recommender 520 can provide a user with recommended contents matched with the SID (S12). For example, the recommender 520 accesses a content index 290 where contents are listed, and retrieves and provides a content recorded in the content index 290 (S13).

Alternatively, the recommendation engine 380 may access the activity history DB 470 and the content index 290. Thus, the recommendation engine 380 may provide a content matched with the SID to a user (S14, S15).

In brief, the image processing apparatus 100, according to an exemplary embodiment, previously stores a database including a record where biometric information about a user and activity feature information about the user history of using the image processing apparatus 100 are recorded. If a user is authenticated with regard to the previously registered ID, the image processing apparatus 100 provides a service corresponding to the ID to him/her.

On the other hand, if an event occurs to identify the current user while the user is not authenticated with regard to the registered ID, the image processing apparatus 100 acquires at least one of the biometric information and the activity feature information with respect to the current user, and identifies the current user based on a record having similarity equal to or higher than the preset threshold with at least one of the acquired biometric information and activity feature information among the records of the previously stored database.

Thus, the image processing apparatus 100 can identify a user and provides a custom service to the user without forcing the user to do any separate activity in the state that the user is not authenticated with regard to the registered ID.

A process of providing the recommendation service based on the specified SID by the recommendation engine 380 will be described with reference to FIG. 8.

Figure 8:
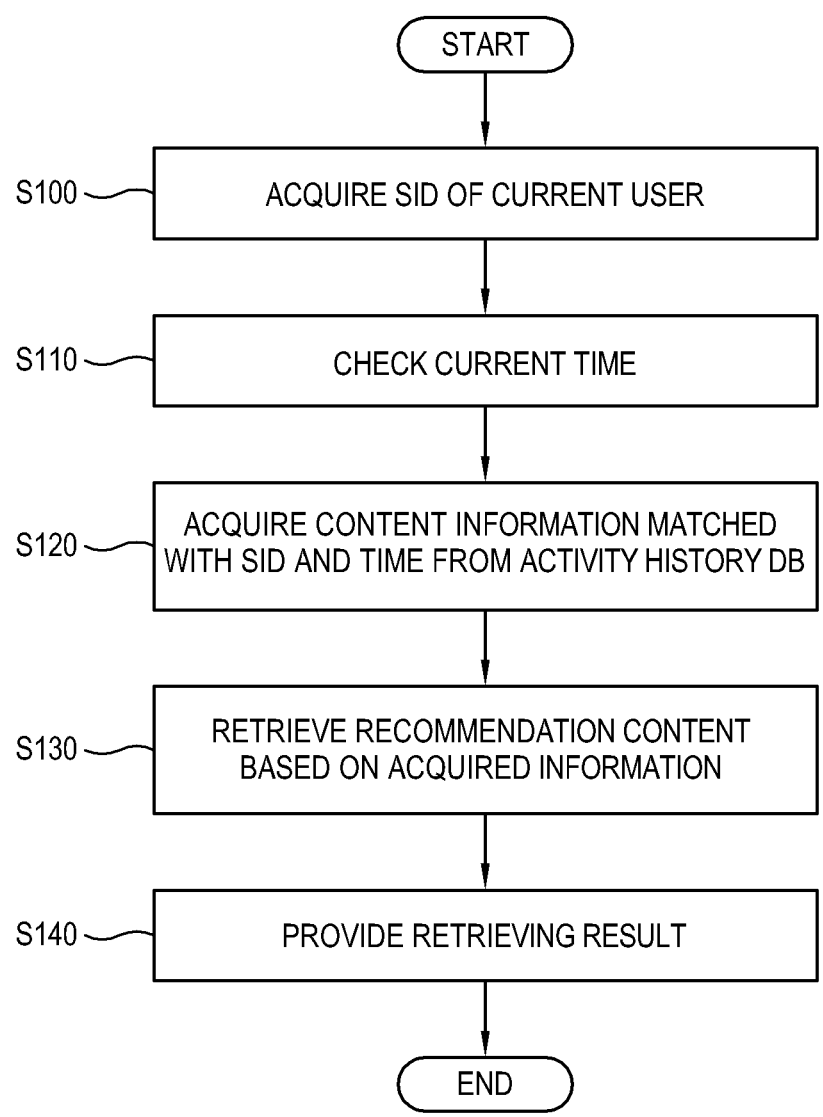
FIG. 8 is a flowchart showing a method of providing a recommendation service by a recommendation engine, in the processor of FIG. 7.

FIG. 8 is a flowchart showing a method of providing a recommendation service by a recommendation engine.

At operation S100, the recommendation engine 380 acquires the SID of the current user. At operation S110, the recommendation engine 380 checks the current time.

At operation S120, the recommendation engine 380 acquires information about content matching with the SID acquired from the activity history DB 470 and the current time. Referring to FIG. 5, if the SID is "S2" and the index of the current time is "2", the recommendation engine 380 retrieves a record having a current time index of "2" among the records of the SID "S2" from the activity history DB 470, and acquires information about a channel, a genre, casting, etc., of the retrieved record.

At operation S130, the recommendation engine 380 retrieves the recommendation contents based on the information acquired from the record. For example, if the information acquired from the record of the activity history DB 470 corresponds to contents involving a channel of "K2", a genre of "movie" and casting of "BBB", the recommendation engine 380 retrieves contents related to each content in the content index 290.

At operation S140, the recommendation engine 380 provides a retrieving result to a user. A method, a UI type, etc., of providing the retrieving result may be variously performed. For example, the recommendation engine 380 may display a guide image for guiding the retrieving result.

In the foregoing method, the recommendation engine 380 acquires the content information in consideration of the current time as well as the acquired SID. However, exemplary embodiments are not limited. Alternatively, the embodiment of acquiring the content information may be variously modified and applied.

For example, although there is no matched time index value, the recommendation engine 380 may select information from the record determined as of the same date among the records subordinate to the SID of the activity history DB 470. Also, the recommendation engine 380 may select information from the record as of the day before or the day before yesterday rather than the same date. Also, if it is determined that the number of records subordinate to the SID is less than a preset threshold, the recommendation engine 380 may select information corresponding to all the records subordinate to the SID regardless of the current time. Further, the recommendation engine 380 may select some part of information among the information of the selected record (for example, the genre and the casting, but not the channel). In selecting the information about the genre, the recommendation engine 380 may optionally select a certain information value (for example, as if selecting a documentary and news, but not a drama and a movie).

Below, a method of controlling the image processing apparatus 100 according to an exemplary embodiment will be described with reference to FIG. 9.

Figure 9:
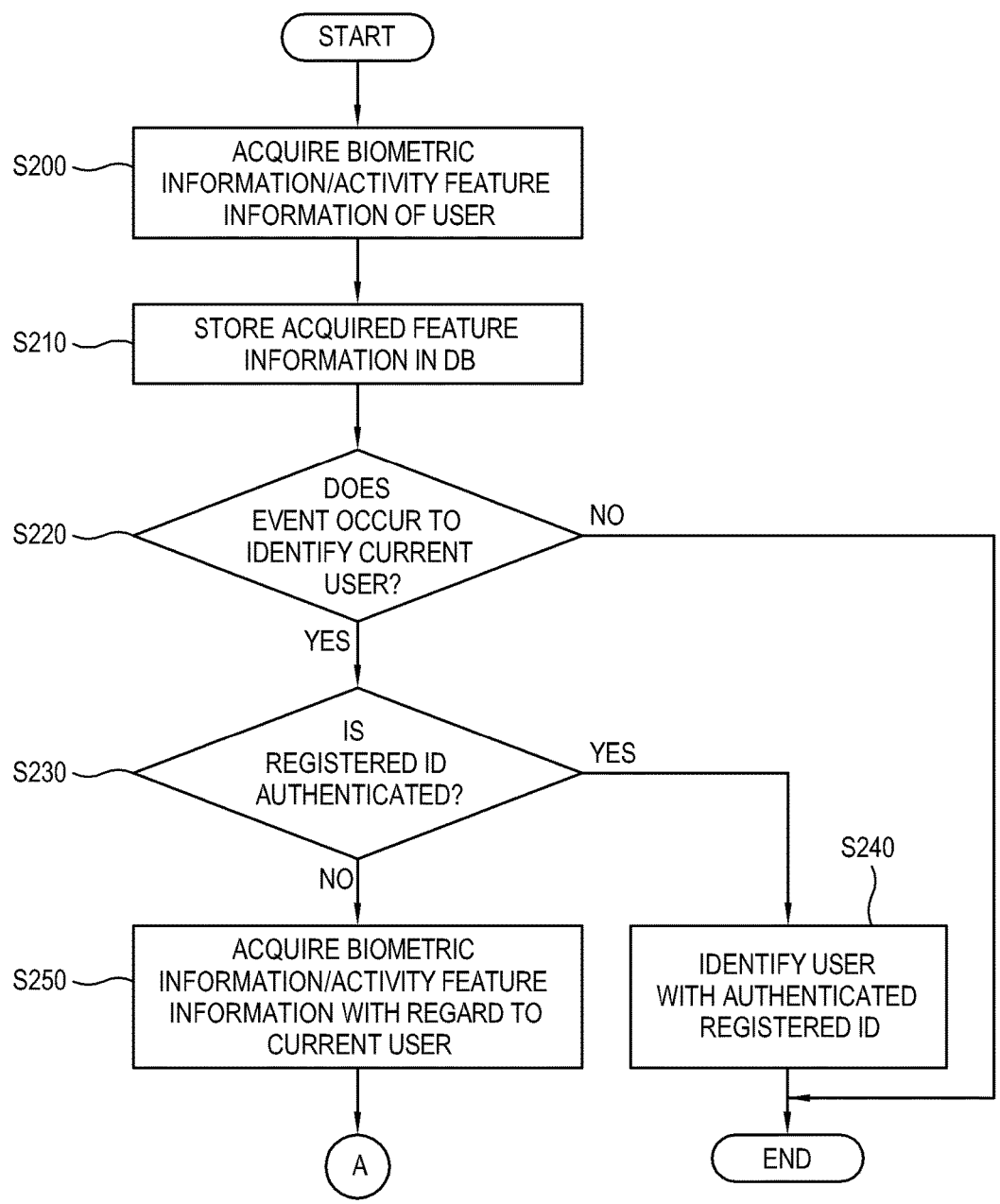
FIGS. 9 and 10 are flowcharts showing a control method of a display apparatus according to a fourth exemplary embodiment.
Figure 10:
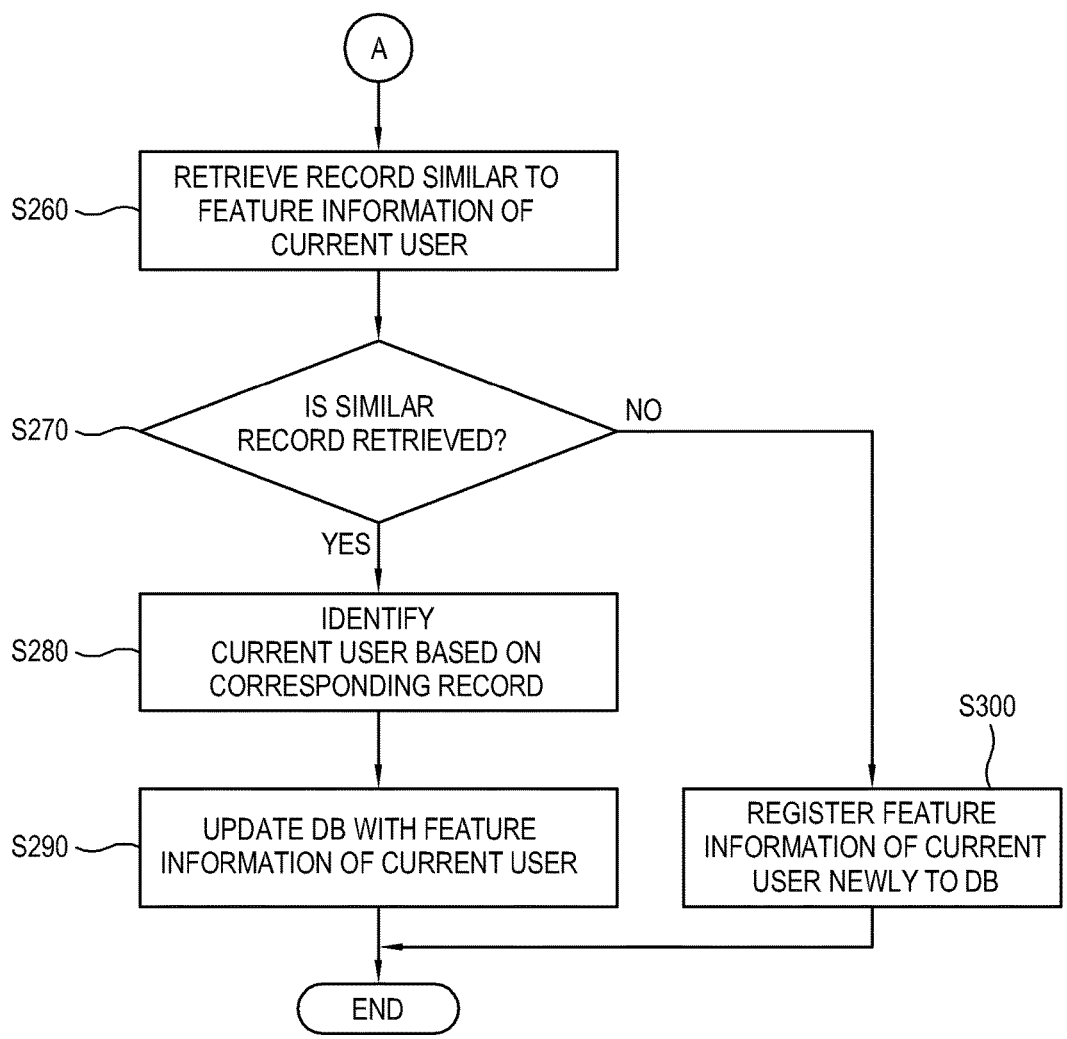

FIGS. 9 and 10 are flowcharts showing a control method of the image processing apparatus 100.

As shown in FIG. 9, at operation S200, the image processing apparatus 100 acquires biometric information about a user and activity feature information about the same user current state of using the image processing apparatus 100. The biometric information includes at least one of a face feature vector and a voice feature vector with regard to the user. The activity feature information includes an activity feature vector related to a history of using the image processing apparatus 100, such as a content viewing history.

At operation S210, the image processing apparatus 100 stores a database for the biometric information and the activity feature information with regard to the user.

At operation S220 if an event occurs to identify the current user, at operation S230 the image processing apparatus 100 determines whether authentication is performed with regard to the previously registered ID.

If the authentication is performed with regard to the registered ID, at operation S240 the image processing apparatus 100 identifies the user with the authenticated registered ID and terminates the present process.

On the other hand, if the authentication is not performed with regard to the registered ID, at operation S250 the image processing apparatus 100 acquires the biometric information and the activity feature information with respect to the current user. The image processing apparatus 100 may acquire both the biometric information and the activity feature information with respect to the current user, or either of the biometric information and the activity feature information.

As shown in FIG. 10, at operation S260 the image processing apparatus 100 retrieves a record similar to the feature information of the current user from the records of the database previously stored in the operation S210.

If the similar record is retrieved at operation S270, the image processing apparatus 100 identifies the current user based on the corresponding records at operation S280. Each record has the SID assigned by the image processing apparatus 100, and the SID is used to identify the current user. Further, at operation S290 the image processing apparatus 100 updates the database with the feature information about the current user, and terminates the present process.

On the other hand, if the similar record is not retrieved in the operation S270, the image processing apparatus 100 determines the current user as a new user at operation S300 and newly registers the feature information about the current user to the database.

When the image processing apparatus 100 acquires a user biometric information in the operation S200 of FIG. 9, the biometric information of a certain type may be not recognized in accordance with the states of the user input interface 140. For example, if the camera (not shown) does not normally operate, the image processing apparatus 100 cannot normally acquire data about a user face or figure. Also, if the microphone 141 does not normally operate, the image processing apparatus 100 cannot normally acquire data about a user voice.

If the image processing apparatus 100 cannot acquire the biometric information of a certain type and thus does not provide any information about the current state to a user, the user cannot know why the image processing apparatus 100 does not normally operate.

Thus, if the image processing apparatus 100 determines that the biometric information is abnormally acquired based on a first input method among a plurality of input methods of the user input interface 140, it displays a UI image for guiding the biometric information to be acquired through a second input method among the plurality of input methods of the user input interface 140.

Figure 11:
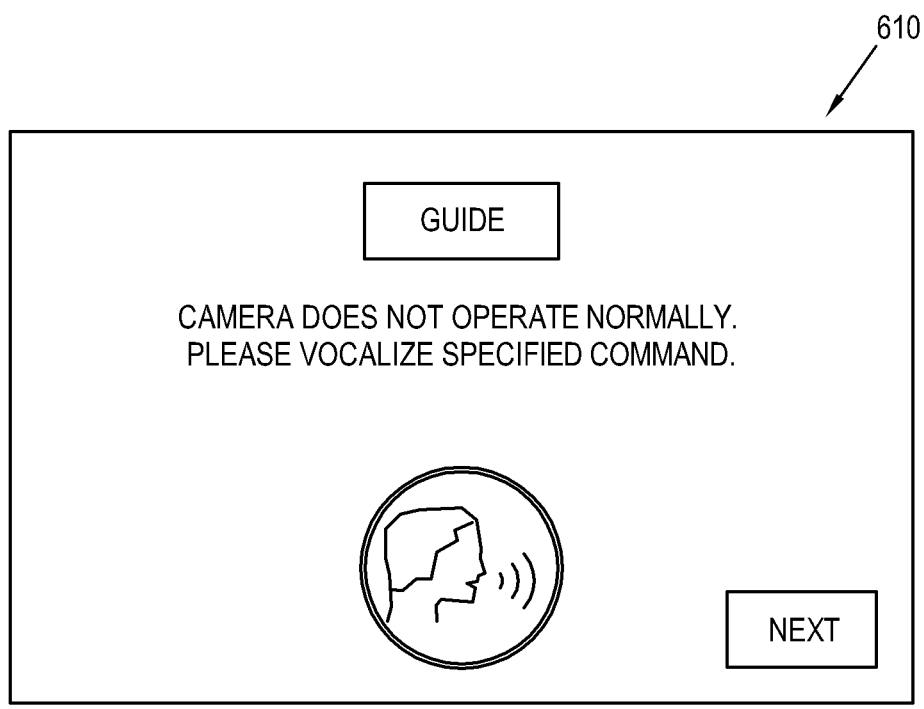
FIG. 11 shows an example of a user interface (UI) image displayed on a display apparatus according to a fifth exemplary embodiment.

As shown in FIG. 11, if the camera (not shown) does not normally operate, the image processing apparatus 100 cannot take an face image of a user. Thus, the image processing apparatus 100 displays a UI image 610 for guiding the current state of the image processing apparatus 100 and operations of a user so that the user voice data can be acquired instead of user face data. The UI image 610 includes a message for informing a user that the image processing apparatus 100 cannot acquire user face data, and requesting a user speech in order to acquire valid biometric information.

Thus, the user makes a speech in accordance with a guide of the UI image 610, and the image processing apparatus 100 acquires the biometric information corresponding to a user speech.

Although a few exemplary embodiments have been shown and described, it will be appreciated by those skilled in the art that changes may be made in these exemplary embodiments without departing from the principles and spirit of the exemplary embodiments, the scope of which is defined in the appended claims and their equivalents.

What is claimed is:

1. An image processing apparatus comprising:
a user input interface;
a storage; and
a processor configured to:
control the user input interface to identify and collect a plurality of pieces of feature information of a plurality of users;
based on similarities between the collected plurality of pieces of feature information of the plurality of users, generate at least one system identification (ID) which corresponds to feature information of at least one of the plurality of users;
control the storage to store the generated at least one system ID and the feature information corresponding to the generated at least one system ID;
based on an event for identifying a current user being occurred, control the user input interface to identify feature information of the current user;
identify a system ID corresponding to feature information identical or similar to the identified feature information of the current user from among the stored at least one system ID;
provide a service, which is provided to the at least one user belonging to the identified system ID, to the current user; and
based on the system ID corresponding to feature information identical or similar to the identified feature information of the current user being not stored, generate a system ID corresponding to the current user and control the storage to store the generated system ID.

2. The image processing apparatus according to claim 1, wherein the user input interface is configured to receive a user input and obtain biometric information of a user,
the processor is configured to:
control the storage to store a registered user ID input by a user,
control the storage to store a database for biometric information of the user corresponding to the system ID, wherein the system ID is generated by the processor and given to the biometric information in the database, based on the event for identifying the current user being occurred, identify whether a first ID input by the current user is identical to the registered user ID, based on the first ID being identical to the registered user ID, provide a first preset service corresponding to the registered user ID, and based on the first ID not being identical to the registered user ID, obtain a system ID corresponding to biometric information of the current user from the database and use history of the image processing apparatus with respect to the current user collected at the event, and provide a second preset service corresponding to the obtained system ID and the collected use history, and wherein the database further comprises activity feature information of the current user with respect to use history of the image processing apparatus which corresponds with the biometric information of the current user, and the processor is further configured to acquire at least one of the biometric information and the activity feature information with respect to the current user, and identifies the current user by retrieving a record having a highest similarity with the acquired one of the biometric information and the activity feature information from the database.

3. The image processing apparatus according to claim 2, wherein the biometric information comprises at least one of a voice feature vector of a user voice and a face feature vector of a user face.

4. The image processing apparatus according to claim 2, wherein in response to determining that biometric information acquired through a first input method among a plurality of input methods of the user input interface is abnormal, the processor is further configured to control a user interface (UI) image to be displayed for guiding an input based on a second input method so that the biometric information can be acquired through the second input method among the plurality of input methods of the user input interface.

5. The image processing apparatus according to claim 2, wherein the database comprises a system ID assigned for distinguishing between respective records each of which comprises biometric information and activity feature information, and the processor is further configured to identify the current user by assigning the system ID to the record having the highest similarity to the current user.

6. The image processing apparatus according to claim 5, wherein the processor is further configured to update the record having the highest similarity in the database with the acquired one of the biometric information and activity feature information.

7. The image processing apparatus according to claim 5, wherein the database comprises a record of a group comprising a plurality of users, and the processor is further configured to derive at least one of biometric information and activity feature information with regard to each of a plurality of current users if the plurality of current users is sensed, and retrieve the record of the group comprising a same number of the users as a number of current users among the records of the database.

8. The image processing apparatus according to claim 7, wherein the record of the group comprises biometric information and activity feature information according to the plurality of users who belong to the group, and the processor is further configured to determine similarity by comparing at least one of the biometric information and the activity feature information individually derived with respect to each of the plurality of current users with biometric information and activity feature information of each user in the record of the group.

9. The image processing apparatus according to claim 5, wherein the processor is further configured to determine a current time in response to the system ID of the current user being identified, and select and provide a recommendation content based on the current time from a history that the current user which corresponds with the system ID has used the image processing apparatus.

10. The image processing apparatus according to claim 9, wherein the use history of the image processing apparatus comprises a history of viewing an image program according to a time and a day of week, and the processor is further configured to select a recommendation program based on the current time among image programs which correspond with the history of viewing and control a guide image which notifies a selection result to be displayed.

11. A method of controlling an image processing apparatus, the method comprising:

identifying and collecting a plurality of pieces of feature information of a plurality of users;

based on similarities between the collected plurality of pieces of feature information of the plurality of users, generating at least one system identification (ID) which corresponds to feature information of at least one of the plurality of users;

storing the generated at least one system ID and the feature information corresponding to the generated at least one system ID in a storage;

based on an event for identifying a current user being occurred, identifying feature information of the current user;

identify a system ID corresponding to feature information identical or similar to the identified feature information of the current user from among the stored at least one system ID;

providing a service, which is provided to the at least one user belonging to the identified system ID, to the current use; and based on the system ID corresponding to feature information identical or similar to the identified feature information of the current user being not stored, generating a system ID corresponding to the current user and storing the generated system ID the storage.

12. The method according to claim 11, further comprising:

based on the event for identifying the current user being occurred, identifying whether a first ID input by the current user is identical to a registered user ID input by a user and stored in a storage in the image processing apparatus, wherein the storage stores a database for biometric information of the user corresponding to a system ID generated by the image processing apparatus and given to the biometric information in the database, based on the first ID being identical to the registered user ID, providing a first preset service corresponding to the registered user ID, and based on the first ID not being identical to the registered user ID, obtaining a system ID corresponding to biometric information of the current user obtained via a user input interface from the database and use history of the image processing apparatus with respect to the current user collected at the event, and providing a second preset service corresponding to the obtained system ID and the collected use history, and wherein the database further comprises activity feature information of the current user with respect to use history of the image processing apparatus which corresponds with the biometric information of the current user, at least one of the biometric information and the activity feature information with respect to the current user is acquired, and the obtaining the system ID corresponding to the biometric information of the current user comprises identifying the current user by retrieving a record having a highest similarity with the acquired one of the biometric information and the activity feature information from the database.

13. The method according to claim 12, wherein the biometric information of the current user comprises at least one of a voice feature vector of a user voice and a face feature vector of a user face.

14. The method according to claim 12, further comprising, in response to determining that biometric information acquired through a first input method among a plurality of input methods of a user input interface is abnormal, displaying a user interface (UI) image for guiding an input based on a second input method so that the biometric information can be acquired through the second input method among the plurality of input methods of the user input interface.

15. The method according to claim 12, wherein the database comprises a system ID assigned for distinguishing between respective records each of which comprises biometric information and activity feature information, and the identifying the current user comprises identifying the current user by assigning the system ID given to the record having the highest similarity to the current user.

16. The method according to claim 15, wherein the obtaining the system ID corresponding to the biometric information of the current user comprises updating the record having the highest similarity in the database with the acquired one of the biometric information and the activity feature information.

17. The method according to claim 15, wherein the database comprises a record of a group comprising a plurality of users, and the identifying the current user comprises:
deriving at least one of biometric information and activity feature information with regard to each of a plurality of current users if the plurality of current users is sensed; and
retrieving the record of the group comprising a same number of the users as a number of current users among the records of the database.

18. The method according to claim 17, wherein the record of the group comprises biometric information and activity feature information according to the plurality of users who belong to the group, and the identifying the current user comprises determining similarity by comparing at least one of the biometric information and the activity feature information individually derived with respect to each of the plurality of current users with biometric information and activity feature information of each user in the record of the group.

19. The method according to claim 15, wherein the identifying the current user comprises determining a current time in response to the system ID of the current user being identified, and the providing the second preset service comprises selecting and providing a recommendation content based on the current time from a history that the current user which corresponds with the system ID has used the image processing apparatus.

20. The method according to claim 19, wherein the use history of the image processing apparatus comprises a history of viewing an image program according to a time and a day of week, and the selecting and providing a recommendation content comprises selecting a recommendation program based on the current time among image programs which correspond with the history of viewing and displaying a guide image which notifies a selection result.

21. An image processing apparatus comprising:
a user input interface;
a processor configured to process a content data signal and a broadcasting signal input, which are externally input to the image processing apparatus, to be displayed as an image; and
a storage,
wherein the processor is further configured to:
control the user input interface to identify and collect a plurality of pieces of feature information of a plurality of users;
based on similarities between the collected plurality of pieces of feature information of the plurality of users, generate at least one system identification (ID) which corresponds to feature information of at least one of the plurality of users;
control the storage to store the generated at least one system ID and the feature information corresponding to the generated at least one system ID;
based on an event for identifying a current user being occurred, control the user input interface to identify feature information of the current user;
identify a system ID corresponding to feature information identical or similar to the identified feature information of the current user from among the stored at least one system ID;
provide a service, which is provided to the at least one user belonging to the identified system ID, to the current user; and
based on the system ID corresponding to feature information identical or similar to the identified feature information of the current user being not stored, generate a system ID corresponding to the current user and control the storage to store the generated system ID.

22. The image processing apparatus according to claim 21, wherein the user input interface is configured to receive a user input and obtain biometric information of a user,
the processor is configured to:
control the storage to store a registered user ID input by a user,
control the storage to store a database for biometric information of the user corresponding to the system ID, wherein the system ID is generated by the processor and given to the biometric information in the database,
based on the event for identifying the current user being occurred, identify whether a first ID input by the current user is identical to the registered user ID,
based on the first ID being identical to the registered user ID, provide a first preset service corresponding to the registered user ID, and
based on the first ID not being identical to the registered user ID, obtain a system ID corresponding to biometric information of the current user obtained via the user input interface from the database and use history of the image processing apparatus with respect to the current user collected at the event, and provide a second preset service corresponding to the obtained system ID and the collected use history, and wherein the processor is further configured to generate a new user ID corresponding to the biometric information of the current user in response to determining that a user ID which corresponds to the biometric information of the current user is not present in the database, and update the database with the new user ID.

* * * * *